Patented Mar. 8, 1932

1,848,747

UNITED STATES PATENT OFFICE

LEON A. PIGUET, OF HAMBURG, AND ROY L. HUNT, OF BUFFALO, NEW YORK, ASSIGNORS TO NATIONAL ANILINE & CHEMICAL CO., INC., OF NEW YORK, N. Y., A CORPORATION OF NEW YORK

PROCESS OF SALTING-OUT AMINO-H-ACID FROM AN AQUEOUS SOLUTION OF THE SAME

No Drawing. Application filed July 7, 1926. Serial No. 121,050.

This invention relates to a process for separating substances from solutions and, in its specific application, to the crystallization or precipitation of substances by the addition of a suitable agent.

In the separation of a precipitate from its mother-liquor by filtration, the degree of separation and the speed of the filtration operation depend to a large extent upon the physical form of the precipitate.

For economically practical operations it is highly desirable that the precipitate be in the form of a slurry which is substantially free from slime and which can be readily filtered. Such a slurry can be handled on a continuous filter instead of requiring a filter-press, and it can be washed with a relatively small proportion of washing liquid, for example, about 10 to 15 per cent, of that required for like results with a filter-press. This not only materially reduces the time required for the filtration and washing operations, but it also reduces the quantity of salt or other substance used to make up the wash liquor when such substances are employed.

The present invention is based upon the discovery that, in the precipitation of an aromatic acid from a solution containing it by means of a precipitant, the physical form of the precipitate varies with the concentration of the precipitant in the solution at the time of precipitation. Thus it has been found that in precipitating an aromatic acid from a solution containing it by means of a precipitant, the precipitate will be slimy or readily filterable depending upon the concentration of the precipitant in the solution when precipitation takes place, other conditions being equal.

As an illustration of this phenomenon the salting out of crude amino-H acid from its solution may be cited. In the course of the preparation of amino-H acid (1-naphthylamine-3.6.8-trisulfonic acid) in accordance with the well known procedure there is obtained an aqueous solution containing about 5 per cent of amino-H acid and about 15 per cent of free mineral acid (e. g., hydrochloric acid or sulfuric acid). If the amino-H acid is salted out from such a solution by the addition of common salt in such an amount that its concentration in the solution when the precipitate begins to separate out is about 5 per cent, a slimy precipitate is obtained which is difficult to filter. If the salt concentration, however, is about 10 to 15 per cent when the precipitate begins to form, a crystalline deposit settles out forming a slurry which can be readily filtered on a continuous or other suitable filter. These percentages are merely illustrative and vary with conditions of temperature, amount of acid present, and the like.

In accordance with this discovery, the present invention provides a means for controlling the physical form of the precipitate, since by controlling the concentration of the precipitant in the solution when precipitation takes place, the form of the precipitate can be controlled.

According to the present invention, an aromatic acid is caused to precipitate from a solution containing it by means of a precipitant contained in the solution in a concentration at least sufficient to produce a readily filterable precipitate.

This can be accomplished in several ways. Thus, the solution of the substance to be precipitated can be added to a solution containing the precipitant in an amount sufficient to form with said first mentioned solution a solution containing the precipitant in at least the desired concentration; or the precipitant can be added to a solution of the substance to be precipitated under such conditions that a solution containing the precipitant in a concentration at least sufficient to give a readily filterable precipitate is produced prior to the formation of any precipitate. When, as in some cases, the aromatic acid is precipitated in the form of its salt by the action of another salt as precipitant and reduces the concentration of the precipitant in the solution, the concentration of the precipitant is maintained at least at the concentration necessary to form a readily filterable precipitate, for example, by the addition to the solution of additional precipitant as it is removed.

In order that the invention may be more fully comprehended it is hereinafter described in its application to the salting out of crude amino-H acid, i. e., 1-naphthylamine-3.6.8-trisulfonic acid, from a solution containing about 5 to 6 per cent of amino-H acid and about 13 to 16 per cent of sulfuric acid. It is applicable to the separation of other substances in solution, however, and the invention is to be accorded a breadth commensurate with the scope of the appended claims.

*Example 1.*—A solution of crude amino-H acid containing about 5 to 6 per cent of amino-H acid and about 13 to 16 per cent of sulfuric acid is placed in a vessel, and a quantity of common salt (NaCl) is then added with very rapid agitation of the solution so that the necessary salt concentration is obtained before precipitation begins. The quantity of salt added depends upon the quantity of solution used, being about 10 to 15 per cent, preferably about 12 to 13 per cent of the weight of the amino-H acid solution, thus forming about a 10 to 15, preferably about a 12 to 13, per cent salt solution.

There precipitates a crystalline deposit of a sodium salt, probably the disodium salt, of the amino-H acid which readily filters on a continuous filter, and a filter-cake of high purity results on washing with only a relatively small amount of wash liquor.

*Example 2.*—A heel of salt liquor (that is, a portion of a batch of mixture from a previous operation of the process) is retained in a salting vat. This mixture contains a concentrated solution of salt (NaCl), a dilute solution of hydrochloric and sulfuric acids, a solution of the sodium salt of amino-H acid, and precipitated sodium salt of amino-H acid. The concentration of salt (NaCl) in this mixture is about 10 to 15 per cent. Into this mixture is pumped some of the unsalted crude amino-H acid solution and agitation is started. Salt is added to restore the salt concentration, and additional crude amino-H acid solution and salt are supplied in proportionate amounts adapted to maintain the requisite salt concentration of about 10 to 15 per cent, preferably about 12 to 13 per cent. The normal temperature at which the operation is carried out is around 30° to 35° C.; but temperatures ranging from 15° to 45° C. have no apparent material effect on the character of the precipitate. When the process has been carried out to the desired point, the mixture is drawn off from the vat and filtered, and the cake is washed with about 10 to 15 per cent of washing liquid. A crystalline deposit of the type above described is obtained. In drawing off the mixture, a portion is retained in the vat to form the reaction medium for a repetition of the process, this portion being the heel referred to above.

The character of the agitation employed necessarily depends upon the procedure followed in the salting. If the salt is added in bulk to the acid solution, very vigorous agitation is required to obtain the necessary concentration of salt in solution before precipitation begins. On large scale operations such a condition becomes difficult and impractical, and accordingly the second process outlined is preferred. With this preferred method, simple agitating means can be utilized, since the maintenance of a heel of salted solution of the desired salt concentration insures precipitation from a solution containing the necessary quantity of salt. Air agitation alone is then found sufficient, which presents the additional advantage of freedom from parts subject to corrosion. Consequently, acid solutions are amenable to the treatment described without the large upkeep required with ordinary agitated equipment. It is also found that with this process coarse rock salt can be used instead of common fine or table salt, reducing the cost of salt by about one half.

In addition to the precipitation of the sodium salt of amino-H acid, the process finds application to the precipitation of naphthalene sulfonic acids or their salts generally, carboxylic acids, and other acids or derivatives where similar conditions exist as to the nature of the precipitant in its relation to solubility, concentration, or the presence of acids or the like. Furthermore, other precipitating agents may be employed, such as other alkali metal inorganic salts, for example, ammonium or potassium chloride, ammonium or potassium sulfate, and the like.

We claim:

1. In the process of separating amino-H acid out of a solution containing it by means of an alkali metal salt, the improvement which comprises maintaining the alkali metal salt in the solution at a concentration not less than 10 per cent.

2. In the process of separating amino-H acid out of a solution containing it by means of an alkali metal salt, the improvement which comprises forming a solution containing the salt in a concentration of not less than 10 per cent, adding portions of the acid solution to the salt solution, and adding portions of the salt to the salt solution.

3. In the process of separating amino-H acid out of an aqueous solution containing it by means of an alkali metal salt, the improvement which comprises salting out the amino-H acid from its solution while maintaining the alkali metal salt in the solution at a concentration of 10 to 15 per cent.

4. The process of separating amino-H acid out of an aqueous solution containing it together with a mineral acid which comprises forming an aqueous solution of common salt containing the salt in a concentration of not less than 10 per cent, adding portions of the amino-H acid solution to the salt solution, and adding common salt to the salt solution in amounts sufficient to maintain its original concentration in the solution.

5. The process of precipitating amino-H acid from a solution containing it which comprises precipitating the acid from the solution by means of an alkali metal salt in a concentration of 10 to 15 per cent.

6. The process of precipitating amino-H acid from a solution containing it which comprises precipitating the acid from the solution by means of an alkali metal salt having a concentration of 10 to 15 per cent during the precipitation.

7. The process of precipitating amino-H acid from a solution containing it which comprises precipitating the amino-H acid from the solution by means of an alkali metal chloride having a concentration of not less than 10 per cent., and maintaining such concentration.

8. The process of precipitating amino-H acid from a solution containing it which comprises precipitating the amino-H acid from its solution by means of an alkali metal salt having a concentration of from about two to about three times the concentration of the amino-H acid, and maintaining the salt in solution at such concentration.

9. The process of precipitating amino-H acid from a solution containing it which comprises precipitating the amino-H acid from its solution by means of an alkali metal chloride having a concentration of from about two to about three times the concentration of the amino-H acid, and maintaining the salt in solution at such concentration.

10. The process of separating amino-H acid out of a solution containing it which comprises salting the amino-H acid out of a solution which contains about 5 to 6 per cent. of amino-H acid, about 13 to 16 per cent. of sulfuric acid and about 10 to 15 per cent. of common salt before precipitation occurs.

11. The process of separating amino-H acid out of an aqueous solution containing about 5 to 6 per cent. of amino-H acid and about 13 to 16 per cent. of sulfuric acid which comprises adding the solution to an aqueous solution of common salt having a concentration of about 10 to 15 per cent.

12. The process of separating amino-H acid out of an aqueous solution containing about 5 to 6 per cent. of amino-H acid and about 13 to 16 per cent. of sulfuric acid which comprises adding to the solution an amount of common salt sufficient to form a 10 to 15 per cent. solution of the salt.

13. The process of separating amino-H acid out of an aqueous solution containing about 5 to 6 per cent. of amino-H acid and about 13 to 16 per cent. of sulfuric acid which comprises salting the amino-H acid out of the solution by means of common salt while maintaining the concentration of the common salt in the solution at about 10 to 15 per cent.

14. The process of separating amino-H acid out of an aqueous solution containing about 5 to 6 per cent. of amino-H acid and about 13 to 16 per cent. of sulfuric acid which comprises forming an aqueous solution of common salt containing the salt in a concentration of about 10 to 15 per cent. adding portions of the amino-H acid solution to the salt solution, and adding common salt to the salt solution in amounts sufficient to maintain its concentration in the solution.

15. The process of separating crude amino-H acid out of an aqueous solution containing about 5 to 6 per cent. of amino-H acid and about 13 to 16 per cent. of sulfuric acid which comprises salting out amino-H acid from the solution by means of common salt while maintaining the concentration of the common salt in the solution at about 12 to 13 per cent. and the temperature at about 30° to 35° C.

16. The process of separating crude amino-H acid out of an aqueous solution containing about 5 to 6 per cent. of amino-H acid and about 13 to 16 per cent. of sulfuric acid which comprises salting out amino-H acid from the solution by means of common salt while maintaining the concentration of the common salt in the solution at about 12 to 13 per cent., removing a portion of the resulting mixture, adding a quantity of the amino-H acid solution to the remaining mixture, and concurrently adding common salt in an amount sufficient to maintain its concentration in solution in the mixture, while maintaining the temperature at about 15° to 45° C.

17. The process of separating crude amino-H acid out of a solution containing about 5 to 6 per cent. of amino-H acid and about 13 to 16 per cent. of sulfuric acid which comprises salting out amino-H acid from the solution by means of rock salt while maintaining the concentration of the rock salt in the solution at about 12 to 13 per cent., removing a portion of the resulting mixture, adding portions of the amino-H acid solution to the remaining mixture, maintaining the concentration of dissolved rock salt in the mixture by the concurrent addition of the necessary quantities of rock salt, and maintaining the temperature at about 30° to 35° C.

In testimony whereof we affix our signatures.

LEON A. PIGUET.
ROY L. HUNT.